(12) United States Patent
Krauss

(10) Patent No.: US 9,390,126 B2
(45) Date of Patent: Jul. 12, 2016

(54) DISTRIBUTED ANALYTICS FOR ENTITY RESOLUTION

(71) Applicant: International Business Machines Corporation, Armonk, NY (US)

(72) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 14/170,665

(22) Filed: Feb. 3, 2014

(65) Prior Publication Data

US 2015/0220588 A1  Aug. 6, 2015

(51) Int. Cl.
 G06F 7/00 (2006.01)
 G06F 17/00 (2006.01)
 G06F 17/30 (2006.01)

(52) U.S. Cl.
 CPC ................... G06F 17/30424 (2013.01)

(58) Field of Classification Search
 CPC ............. G01B 21/04; G06F 17/30259; G06F 17/30601
 USPC ........................................................ 707/692
 See application file for complete search history.

(56) References Cited

U.S. PATENT DOCUMENTS

| 7,272,632 B2 | 9/2007 | Endo |
| 8,150,813 B2 | 4/2012 | Adair et al. |
| 8,352,460 B2 | 1/2013 | Allen et al. |
| 8,510,323 B2 | 8/2013 | Eshwar et al. |
| 8,554,719 B2 | 10/2013 | McGrew et al. |
| 8,706,732 B1 * | 4/2014 | Janos ................ G06F 17/3087 |
| | | 707/705 |
| 8,990,211 B1 * | 3/2015 | Janos ................ G06F 17/30011 |
| | | 707/705 |
| 2008/0133891 A1 * | 6/2008 | Salz .......................... G06F 8/30 |
| | | 712/220 |
| 2010/0113091 A1 * | 5/2010 | Sharma ................ G06K 9/4642 |
| | | 455/556.1 |
| 2011/0225158 A1 * | 9/2011 | Snyder .............. G06F 17/30601 |
| | | 707/737 |
| 2013/0013114 A1 * | 1/2013 | Magato ............ G05B 19/41885 |
| | | 700/275 |
| 2013/0013444 A1 | 1/2013 | Vandikas et al. |
| 2013/0054598 A1 | 2/2013 | Caceres |
| 2013/0066851 A1 | 3/2013 | Allen et al. |
| 2013/0085954 A1 | 4/2013 | Hanneman et al. |

(Continued)

OTHER PUBLICATIONS

Dotoli et al., "Candidate Selection for Network Design of Distributed Manufacturing Systems", 2004 IEEE International Conference on Systems, Man and Cybernetics, 0-7803-8566-7/04, Copyright 2004 IEEE, pp. 1613-1618.

(Continued)

*Primary Examiner* — Binh V Ho
(74) *Attorney, Agent, or Firm* — Bryan D. Wells; David M. Quinn

(57) ABSTRACT

A first plurality of processors of a plurality of nodes receives an observation from a second plurality of processors of the plurality of nodes, wherein the observation includes data representing an observed entity. The second processors access a persistent data store based, at least in part, on the observation. The first processors determine one or more features of the observed entity. The second processors access the persistent data store based, at least in part, on the determined features of the observed entity. The first processors select a candidate entity based, at least in part, on the observed entity. The first processors determine a relationship between the candidate entity and the observed entity. The first processors determine a resolved entity by resolving, by the first plurality of processors, the observed entity. The second processors access the persistent data store based, at least in part, on the resolved entity.

12 Claims, 4 Drawing Sheets

(56) References Cited

U.S. PATENT DOCUMENTS

| | | | |
|---|---|---|---|
| 2013/0132399 A1* | 5/2013 | Adair | G06F 17/30345 707/747 |
| 2013/0226681 A1 | 8/2013 | Bastos et al. | |
| 2013/0232129 A1 | 9/2013 | Cheng et al. | |
| 2014/0278210 A1* | 9/2014 | Krauss | G01B 21/04 702/150 |
| 2014/0379296 A1* | 12/2014 | Nathan | G06Q 10/08 702/150 |
| 2015/0098565 A1* | 4/2015 | Jonas | G06F 21/6209 380/44 |
| 2015/0169638 A1* | 6/2015 | Jaber | G06F 17/30259 707/749 |

OTHER PUBLICATIONS

Nuray-Turan et al., "Adaptive Connection Strength Models for Relationship-Based Entity Resolution", pp. 1-22, Copyright 2013 ACM 1936-1955/2013/03-ART8, DOI:http://dx.doi.org/10.1145/2435221.2435224, ACM Journal of Data and Information Quality, vol. 4, No. 2, Article 8, Publication date: Mar. 2013.

"System and method to improve the performance of the candidate list generation process of an Entity Analytics system using in-memory, read-only cache", An IP.com Prior Art Database Technical Disclosure, IP.com No. IPCOM000212210D, IP.com Electronic Publication: Nov. 4, 2011, pp. 1-19.

* cited by examiner

DISTRIBUTED ANALYTICS FOR ENTITY RESOLUTION

FIELD OF THE INVENTION

The present disclosure relates generally to the field of data analytics, and more particularly to distributed analytics for entity resolution.

BACKGROUND OF THE INVENTION

Data analytics is a process of inspecting, cleaning, transforming, and modeling data with the goal of discovering useful information, suggesting conclusions, and supporting decision making. Entity resolution systems utilize data analytics to make assertions based on data from real-time, real-world events and observations. Entity resolution systems also determine related observations that, in context together, enable useful conclusions.

SUMMARY

Embodiments of the present disclosure provide a method, system, and computer program product for distributed analytics processing. A first plurality of processors of a plurality of nodes receives an observation from a second plurality of processors of the plurality of nodes, wherein the observation includes data representing an observed entity. The second plurality of processors accesses a persistent data store based, at least in part, on the observation. The first plurality of processors determines one or more features of the observed entity. The second plurality of processors accesses the persistent data store based, at least in part, on the determined features of the observed entity. The first plurality of processors selects a candidate entity based, at least in part, on the observed entity. The first plurality of processors determines a relationship between the candidate entity and the observed entity. The first plurality of processors determines a resolved entity by resolving, by the first plurality of processors, the observed entity. The second plurality of processors accessing the persistent data store based, at least in part, on the resolved entity.

DETAILED DESCRIPTION

Figure 1:
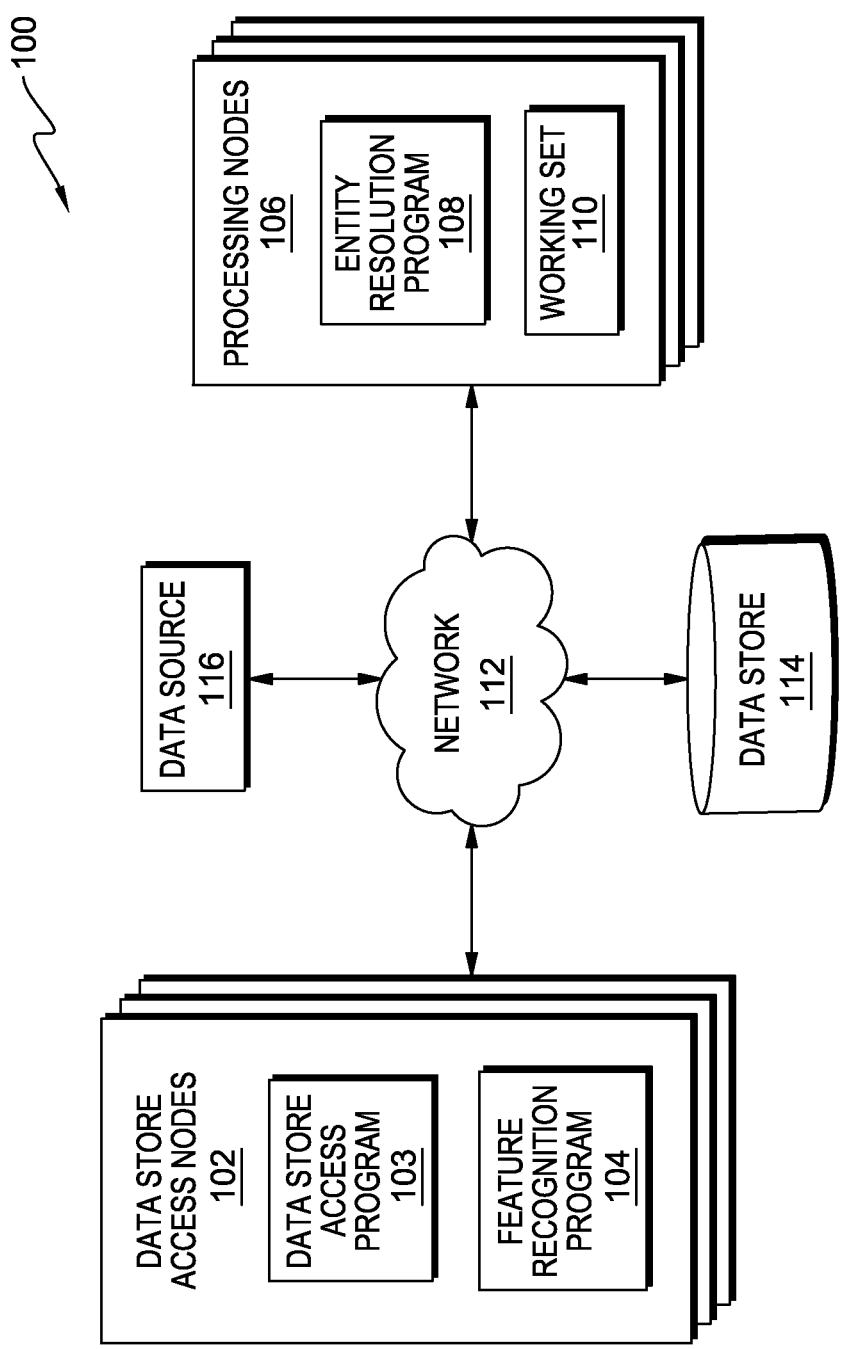
FIG. 1 is a functional block diagram illustrating a distributed data processing environment, in accordance with an embodiment of the present disclosure.

Embodiments of the present disclosure recognize that the scalability of entity resolution systems is limited. Further recognized is that operations performed by entity resolution systems requiring frequent database access cause disparate network traffic, which limits the performance of other, computationally-intensive operations such as candidate selection and entity resolution. Further recognized is that the complexity of scoring algorithms is limited for operations such as candidate selection, determining identity, and determining relationships between entities because additional complexity requires increased database access in such entity resolution systems. Further recognized is that database access tends to be a bottleneck for entity resolution systems.

Embodiments of the present disclosure provide for distributing computationally-intensive entity resolution system operations among a scalable pool of processing nodes. Further provided is that the processing nodes maintain (e.g., in memory) a copy of data relevant to the computationally-intensive operations. Further provided is that the copy of relevant data maintained (e.g., in memory) includes candidate data, thereby enabling increased complexity of scoring algorithms without increasing database access. Further provided is performing the persistent storage workload fundamental to high-availability entity resolution via bulk operations in order to utilize a relational database management system to optimize the access.

Some entity resolution systems associate entities (such as ships) with their features (such as loads) and feature elements (such as items and tonnages). A system can associate inbound observed entities and features of the observed entities with candidate entities and features of the candidate entities. Candidates are typically selected from entities that have been previously observed, which may include resolved entities and/or observed entities that have not been resolved. When data representing an observed entity is presented to an entity resolution system, the system can compare the observed entity, feature by feature and/or feature element by feature element, with one or more candidate entities. The system can determine a relationship between the observed entity and a candidate entity based on entity resolution rules, scoring algorithms, or ranking schemes. The determined relationship can be a 1:1 (identity, or "is a") relationship, a 1:many ("has a") relationship, or another type of associative relationship. If the determined relationship is 1:1, then the system can resolve the observed entity and the candidate entity by recording data representing an identity relationship, in which case the system can also merge the features of the observed entity with the features of the candidate entity, to the extent applicable for further observations. If the determined relationship is of another type, then the system can record data representing the determined relationship. The system can output this recorded data, along with data representing the incoming observations, to persistent storage. This persistent storage may be arranged via a relational database or by other means suitable for scalability, availability, and performance of the system.

A relational database is a database that includes a collection of tables of data items, all of which is formally described and organized according to the relational model. In the relational model, each table schema must identify a column or group of columns, called the primary key, to uniquely identify each row. A relationship can then be established between each row in the table and a row in another table by creating a foreign key, a column or group of columns in one table that points to the primary key of another table. The database management system (DBMS) of a relational database is called a relational database management system (RDBMS), and is the software of a relational database. Typical RDBMS software is designed to provide high-performance access to persistent storage via query optimization. Exploiting the query optimization capabilities of an RDBMS can involve arranging bulk queries, also known as batch queries, for both search and update (i.e., read and write) operations.

In computing, shared memory is memory that may be simultaneously accessed by multiple programs in order to provide communication among them or avoid redundant copies. In computer hardware, shared memory refers to a (typically large) block of random access memory (RAM) that can be accessed by several different processors in a multiple-processor computer system. Distributed shared memory allows for processes running on disparate computing nodes to communicate via an address space shared among the distributed processes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present disclosure will now be described in detail with reference to the Figures.

FIG. 1 is a functional block diagram illustrating a distributed data processing environment, generally designated 100, in accordance with one embodiment of the present disclosure.

Distributed data processing environment 100 includes data store access nodes 102, processing nodes 106, data store 114, and data source 116, all interconnected over network 112.

Network 112 can be, for example, a local area network (LAN), a wide area network (WAN) such as the Internet, or a combination of the two, and can include wired, wireless, or fiber optic connections. In general, network 112 can be any combination of connections and protocols that will support communications between data store access nodes 102, processing nodes 106, data store 114, and data source 116.

Data source 116 operates to provide data over network 112. The data can include data relevant to entities observable by data store access nodes 102. For example, the data can include data representing one or more observed entities. In one embodiment, data source 116 provides data streams of one or more systems or sensors. For example, data source 116 can provide data store access nodes 102 with messages from the Automatic Identification System, which is the automatic tracking system used on ships and by Vessel Traffic Services for identifying and locating vessels by electronically exchanging data with other nearby ships, AIS base stations, and satellites. In such a case, the observed entities may be ocean-going vessels such as oil tankers, fishing vessels, or cargo ships.

An observation includes information corresponding to at least one observed entity. An observation is a data structure readable by at least feature recognition program 104. In one example, the observation comprises a relational data structure that correlates data representing an observed entity and one or more features. In another example, the observation may comprise data in a structured language, such as Extensible Markup Language (XML). An entity is an object or concept that can be represented by a data structure. An entity has an entity type, which is a category to which the object or concept represented by the entity belongs. In various examples, an entity can have one of a variety of entity types, such as an organization, vehicle, location, event, conversation topic, or social sentiment. An entity type can also be a user-defined entity type. For example, a particular oil tanker entity can have an entity type of "ocean-going vessel." An entity can also have one or more features, each of which has a value. In one example, a cargo ship entity of the ocean-going vessel entity type has features including a location, which has a value representing Global Positioning System (GPS) geospatial coordinates.

Data source 116 can include one or more of a sensor, a monitoring system, a subscription-based service, a data feed, or a computer program. Data source 116 can include one or more of a laptop computer, a tablet computer, a netbook computer, a personal computer (PC), a desktop computer, a personal digital assistant (PDA), a smart phone, or any programmable electronic device capable of communicating with data store access nodes 102, processing nodes 106, and data store 114 via network 112. In other embodiments, data source 116 may represent a server computing system utilizing multiple computers as a server system, such as in a cloud computing environment. Data source 116 may include a different quantity of data sources than in the depicted embodiment. For example, data source 116 may represent a single data source or a plurality of data sources. Further, data source 116 may monitor a single data stream or a plurality of data streams. Data source 116 may include internal and external hardware components, as depicted and described in further detail with respect to FIG. 4.

Data store 114 is a repository that may be written and read by data store access program 103, feature recognition program 104 and entity resolution program 108. Data store 114 organizes data, including a plurality of libraries, each of which organizes data of a particular type that may be stored to and retrieved from data store 114. In some embodiments, data store 114 stores an observed entity library, which includes observations received from data source 116. In some embodiments, data store 114 stores an entity feature library, which includes data representing comparable features of entities. In some embodiments, data store 114 stores a candidate data library, which includes candidate data, which is data that identifies both entities and corresponding features for each entity. In some embodiments, data store 114 stores a resolved entity library, which includes data representing resolved entities and relationships corresponding to resolved entities.

In one embodiment, data store 114 resides within a relational database management system (RDBMS). In other embodiments, data store 114 may reside on or within another server or database system, another computing device, one or more of data store access nodes 102, or one or more of processing nodes 106, provided that data store 114 is accessible to data store access program 103, feature recognition program 104, and entity resolution program 108.

Data store access nodes 102 represents one or more data store access nodes, each of which includes one or more instances of data store access program 103 and one or more instances of feature recognition program 104. In one embodiment, either or both of data store access program 103 and feature recognition program 104 accesses working set 110. Data store access nodes 102 receive one or more observations from data source 116, each of which includes data corresponding to one or more observed entities. Data store access nodes 102 may each be a rack-mountable computer, a virtual machine, a laptop computer, a tablet computer, a netbook computer, a personal computer (PC), a desktop computer, a personal digital assistant (PDA), a smart phone, or any programmable electronic device capable of communicating with processing nodes 106, data store 114, and data source 116 via network 112. In other embodiments, data store access nodes 102 may represent a data store access node system utilizing multiple data store access nodes as a data store access node system, such as in a cloud computing environment. Data store access nodes 102 may each include internal and external hardware components, as depicted and described in further detail with respect to FIG. 4.

Processing nodes 106 represent one or more processing nodes, each of which includes an instance of working set 110 and an instance of entity resolution program 108. In one embodiment, entity resolution program 108 accesses working set 110. Processing nodes 106 may each be a rack-mountable computer, a virtual machine, a laptop computer, a tablet computer, a netbook computer, a personal computer (PC), a desktop computer, a personal digital assistant (PDA), a smart phone, or any programmable electronic device capable of communicating with at least data store access nodes 102 and data store 114 via network 112. In other embodiments, processing nodes 106 may represent a processing node system utilizing multiple processing nodes as a processing node system, such as in a cloud computing environment. Processing nodes 106 may include internal and external hardware components, as depicted and described in further detail with respect to FIG. 4.

Working set 110 is a repository that may be written and read by entity resolution program 108. In some embodiments, working set 110 may also be written and read by data store access program 103 and feature recognition program 104. Working set 110 organizes candidate data by storing a copy of a portion of the candidate data library. In some embodiments, working set 110 includes high-speed storage media (e.g., flash memory or RAM). In one embodiment, each instance of working set 110 stores a copy of a different portion of the candidate data library such that the instances of working set 110 collectively store all portions of the candidate data library. In one embodiment, an instance of working set 110 resides on each of processing nodes 106. In other embodiments, one or more instances of working set 110 may reside on another processing node, one or more of data store access nodes 102, another data store access node, or another computing device, provided that working set 110 is accessible to data store access program 103, feature recognition program 104, and entity resolution program 108.

In some embodiments, processing nodes 106 each maintain a copy of the portion of the candidate data library in working set 110. In some embodiments, processing nodes 106 access data store 114 to synchronize the portion of the candidate data library of working set 110 with data store 114. In various examples, processing nodes 106 can access data store 114 periodically, in response to a notification from data store 114, or in response to determining a condition such as a predetermined amount of change of the candidate data library. In one embodiment, each of processing nodes 106 maintain working set 110, for example, via a low-priority thread operating in parallel with one or more other threads that each performs one or more other operations. In some embodiments, instances of working set 110 collectively store fewer than all portions of the candidate data library. For example, instances of working set 110 may store portions of the candidate data library that are frequently accessed relative to other portions of the candidate data library.

In some embodiments, the candidate data library size exceeds, or grows to exceed, the combined memory capacity of all available nodes, in which case less than all portions of the candidate data library are stored in memory (e.g., within working set 110). In one embodiment, working set 110 is stored partially in the memory of processing nodes 106 and partially in the memory of data store access nodes 102. In other embodiments, working set 110 is stored partially in memory and partially in persistent storage of processing nodes 106 or data store access nodes 102. In yet other embodiments, some or all of working set 110 is stored in paging files or "swap files" of one or more of processing nodes 106 or one or more of data store access nodes 102.

In some embodiments, processing nodes 106 each correspond to the entity type of the candidate data stored in working set 110 of the processing node. For example, a processing node stores candidate data corresponding to a first entity type in memory, in which case the processing node corresponds to the first entity type. In one embodiment, a group of processing nodes 106 may correspond to the same entity type. In one embodiment, the quantity of processing nodes 106 in a group corresponding to an entity type scales with the amount of candidate data, such that the candidate data corresponding to the entity type is stored locally to at least one of processing nodes 106 of the group. In one embodiment, each of processing nodes 106 corresponds to one entity type. In another embodiment, each of processing nodes 106 corresponds to one or more entity types, in which case each processing nodes 106 may belong to one or more groups.

In one embodiment, processing nodes 106 are communicatively connected with each other. In one embodiment, a group of processing nodes 106 communicates with each another in order to redistribute the data stored locally by the processing nodes 106 of the group in response to a change in the quantity of processing nodes 106 in the group. In one example, in response to adding a new processing node to a group, one or more of the existing processing nodes of the group relocate a portion of the local data stored by the group to the new processing node. In another example, in response to the removal of a processing node from a group (e.g., to scale down the size of the group or because of failure of the processing node), the remaining processing nodes of the group communicate with each other to relocate to the remaining processing nodes the data that had been locally stored by the removed processing node. In some embodiments, processing nodes 106 utilize distributed shared memory to store data in a manner accessible to all processing nodes 106 of the group of processing nodes 106. For example, the distributed shared memory may store all or part of a feature type library, which correlates feature types to entities.

In various embodiments, processing nodes 106 communicate via one or more communication protocols and/or pathways. Examples of such communication protocols and/or pathways include, but are not limited to, shared memory, distributed shared memory, application programming interface (API) functionality, named pipes, sockets, message passing interfaces, or InfoSphere® Streams (note: the term "InfoSphere" and the like may be subject to trademark rights in various jurisdictions throughout the world and are used here only in reference to the products or services properly denominated by the marks to the extent that such trademark rights may exist). For example, processing nodes 106 may utilize a message passing interface to send notifications to other processing nodes 106, such as a notification of an update to a library stored in distributed shared memory. In some embodiments, data store access nodes 102 are similarly communicatively connected with each other and/or with processing nodes 106.

Feature recognition program 104 operates to determine features of an observed entity and to assign the observed entity to at least one of the instances of entity resolution program 108 of processing nodes 106. Feature recognition program 104 receives an observation from data source 116. In some embodiments, feature recognition program 104 notifies data store access program 103 of the observation. In other embodiments, feature recognition program 104 updates data store 114 based on the observation. In some embodiments, feature recognition program 104 also updates working set 110 based on the observation. Feature recognition program 104 also determines features, expressed and/or implied, of the observed entity. Feature recognition program 104 updates data store 114 based on data representing the determined features of the observed entity.

In some embodiments, feature recognition program 104 also updates working set 110 based on data representing the determined features of the observed entity. In some embodiments, feature recognition program 104 assigns the observed entity to processing nodes 106. As discussed below, processing nodes 106 can resolve the observed entity with a candidate entity to determine a resolved entity. Further, processing nodes 106 can determine relationships between the resolved entity and the candidate entity. In one embodiment, an instance of feature recognition program 104 resides on each of data store access nodes 102. In other embodiments, one or more instances of feature recognition program 104 may reside on another data store access node, one or more of processing nodes 106, another processing node, or another computing device, provided that feature recognition program 104 can access and is accessible to data store access program 103, processing nodes 106, data store 114, and data source 116. Feature recognition program 104 may perform some or all operations in parallel. For example, feature recognition program 104 may perform, in parallel, a first operation utilizing a first thread and a second operation utilizing a second thread. The first thread and the second thread can perform feature recognition operations, either on distinct observations or on any aspects of a single observation that can be addressed by a plurality of threads operating in parallel.

Data store access program 103 operates to access data store 114. In some embodiments, data store access program 103 receives an observation from data source 116 and updates one or both of data store 114 and working set 110 based on the received observation. In other embodiments, feature recognition program 104 updates one or both of data store 114 and working set 110 based on the received observation. In response to entity resolution program 108 resolving an entity and/or determining a relationship between entities, data store access program 103 receives data representing a resolved entity and/or a determined relationship, and data store access program 103 updates data store 114 based on the received data. In some embodiments, data store access program 103 also updates working set 110 based on the received data representing a resolved entity and/or a determined relationship. In one embodiment, an instance of data store access program 103 resides on each of data store access nodes 102. In other embodiments, one or more instances of data store access program 103 may reside on another data store access node, one or more of processing nodes 106, another processing node, or another computing device, provided that data store access program 103 can access, and is accessible to, feature recognition program 104, processing nodes 106, data store 114, and data source 116. Data store access program 103 may perform some or all operations in parallel. For example, data store access program 103 may perform, in parallel, a first operation utilizing a first thread and a second operation utilizing a second thread. The first thread and the second thread can perform data store access operations, either involving distinct observations, resolved entities, and determined relationships, or on any aspects of a single observation, resolved entity, or determined relationship that can be addressed by a plurality of threads operating in parallel.

Entity resolution program 108 operates to resolve an observed entity with a candidate entity. Entity resolution program 108 receives data representing an observed entity and features of the observed entity from data store access nodes 102. Entity resolution program 108 selects candidate entities from candidate data. Entity resolution program 108 compares features of the observed entity to features of the candidate entities. Entity resolution program 108 can resolve the observed entity with a candidate entity. Entity resolution program 108 can also determine a relationship between the resolved entity and a candidate entity. In one embodiment, an instance of entity resolution program 108 resides on each of processing nodes 106. In other embodiments, one or more instances of entity resolution program 108 may reside on another processing node, one or more of data store access nodes 102, another data store access node, or another computing device, provided that entity resolution program 108 can access and is accessible to working set 110, data store access nodes 102 and data store 114. Entity resolution program 108 may perform some or all operations in parallel. For example, entity resolution program 108 may perform, in parallel, a first operation utilizing a first thread and a second operation utilizing a second thread. The first thread and the second thread can perform entity resolution and relationship determination operations on, for example, distinct observed entities with distinct features or any aspect(s) of a single observed entity or a single feature that can be addressed by a plurality of threads operating in parallel.

Figure 2A:
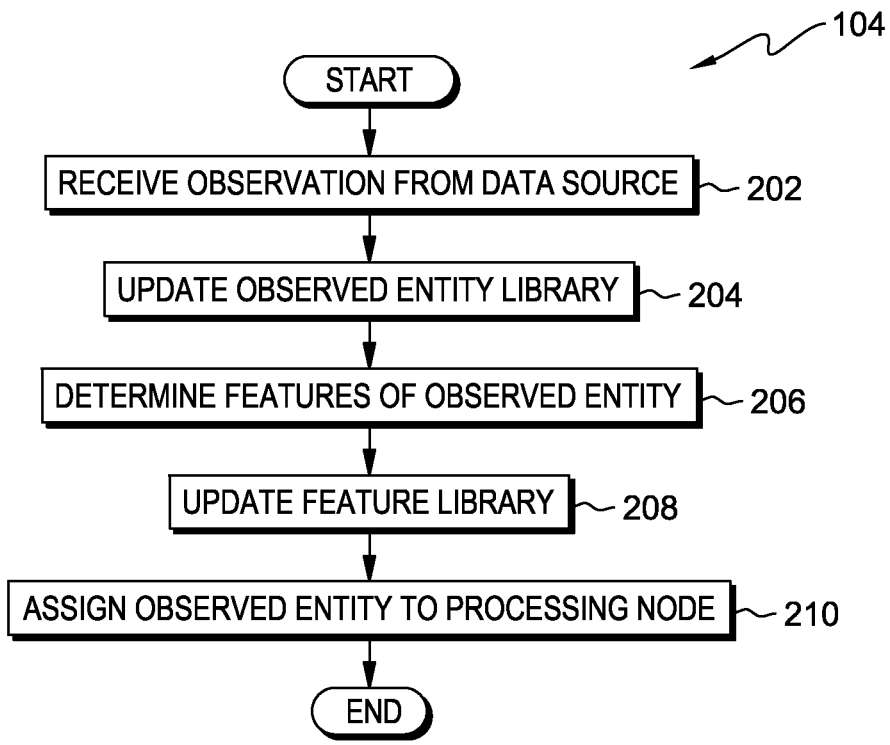
FIG. 2a is a flowchart depicting operational steps of a feature recognition program, operating on a server system, in accordance with an embodiment of the present disclosure.

FIG. 2a is a flowchart depicting operational steps of feature recognition program 104 operating on data store access nodes 102, in accordance with an embodiment of the present disclosure.

In step 202, feature recognition program 104 receives an observation from data source 116. In one embodiment, feature recognition program 104 receives one or more observations from data source 116, each of which includes data related to one or more observed entities. In alternate embodiments, feature recognition program 104 receives an observation from data store access program 103, from a data repository (i.e., data store 114), from an input device other than data source 116, or from another device of distributed data processing environment 100.

In step 204, feature recognition program 104 updates an observed entity library. In one embodiment, feature recognition program 104 updates an observed entity library residing in data store 114. For example, feature recognition program 104 updates an observed entity library of data store 114 based on the observation. In some embodiments, feature recognition program 104 updates a copy of an observed entity library, residing in working set 110 of one or more of processing nodes 106. In some embodiments, feature recognition program 104 notifies data store access program 103 of observed entities and, in response, data store access program 103 updates an observed entity library of one or both of working set 110 and data store 114.

In step 206, feature recognition program 104 determines one or more features of an observed entity. In one embodiment, feature recognition program 104 determines one or more features of the observed entity identified by the observation received in step 202. In one embodiment, feature recognition program 104 determines features of the observed entity by parsing a portion of the observation corresponding to the observed entity.

In step 208, feature recognition program 104 updates a feature library. In one embodiment, feature recognition program 104 updates a feature library residing in data store 114. For example, feature recognition program 104 updates a feature library based on data representing the observed entity and determined features of the observed entity. In some embodiments, feature recognition program 104 updates a feature library corresponding to working set 110 of one or more of processing nodes 106. In some embodiments, feature recognition program 104 provides a notification to data store access program 103 based on data representing the observed entity and determined features of the observed entity. Responsive to receiving the notification from recognition program 104, data store access program 103 updates a feature library of one or both of working set 110 and data store 114.

In step 210, feature recognition program 104 assigns the observed entity to a processing node. In one embodiment, feature recognition program 104 assigns the observed entity to a processing node of processing nodes 106. In some embodiments, assigning the observed entity to a processing node includes sending data representing the observed entity and features of the observed entity to the processing node. In various embodiments, feature recognition program 104 assigns the observed entity based on one or more of the following characteristics: the entity type, the feature type, the determined features of the observed entity, the data source (e.g., data source 116), and the portion of the candidate data library stored within working set 110 of the processing node. In one embodiment, feature recognition program 104 assigns an observed entity to a processing node that stores candidate data corresponding to the entity type and features of the observed entity. For example, feature recognition program 104 assigns an observed entity representing a land vehicle featuring three axels to a processing node that stores candidate data corresponding to land vehicles with two or more axels.

In some embodiments, one or a group of processing nodes 106 serves as a control node. In such embodiments, feature recognition program 104 assigns all observed entities to the control node, which assigns each observed entity to a processing node of processing nodes 106. In various embodiments, the control node assigns the observed entity to a processing node based on one or more of the following: the entity type, the determined features of the observed entity, and the portion of the candidate data library stored on the processing node. In one embodiment, the control node assigns an observed entity to a processing node that stores candidate data corresponding to the entity type and features of the observed entity. In various embodiments, the functionality attributed herein to the control node may be performed by entity resolution program 108 or by another program or process.

Figure 2B:
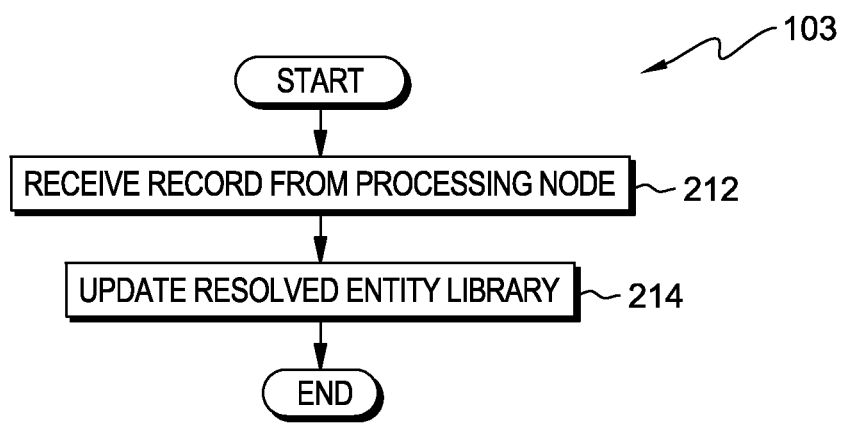
FIG. 2b is a flowchart depicting operational steps of a data store access program, operating on a server system, in accordance with an embodiment of the present disclosure.

FIG. 2b is a flowchart depicting operational steps of data store access program 103 operating on data store access nodes 102, in accordance with an embodiment of the present disclosure.

In step 212, data store access program 103 receives data representing a resolved entity from processing nodes 106. In one embodiment, the resolved entity has one or more features, each of which has a feature value. In yet another embodiment, the resolved entity corresponds to one or more relationships between the resolved entity and at least one second entity.

In step 214, data store access program 103 updates a resolved entity library. In some embodiments, data store access program 103 updates a resolved entity library residing in data store 114. For example, data store access program 103 updates a resolved entity library based on data representing the resolved entity. In some embodiments, data store access program 103 updates a copy of a resolved entity library residing in working set 110 of one or more of processing nodes 106.

Figure 3:
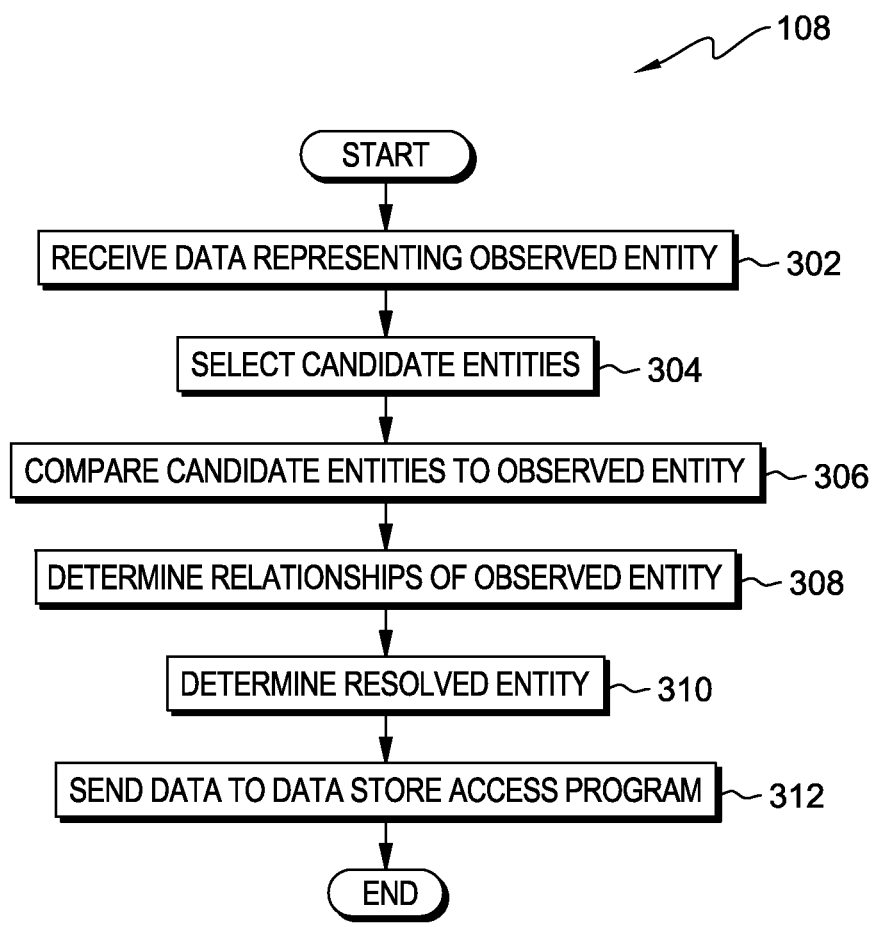
FIG. 3 is a flowchart depicting operational steps of an entity resolution program, operating on a processing node, in accordance with an embodiment of the present disclosure.

FIG. 3 is a flowchart depicting operational steps of entity resolution program 108 operating on processing nodes 106, in accordance with an embodiment of the present disclosure. In one embodiment, entity resolution program 108 receives data representing an observed entity, selects candidate entities from candidate data, and compares the observed entity to the candidate entities in order to resolve the observed entity.

In step 302, entity resolution program 108 receives data representing an observed entity. In one embodiment, the observed entity includes at least one feature, which has an associated feature value. In one embodiment, entity resolution program 108 receives data representing the observed entity from feature recognition program 104 operating on data store access nodes 102. In another embodiment, entity resolution program 108 receives data representing the observed entity from data store access program 103, from a data repository (i.e., data store 114) or from another device of distributed data processing environment 100.

In step 304, entity resolution program 108 selects candidate entities. In one such embodiment, entity resolution program 108 selects one or more candidate entities that are represented within the candidate data of working set 110 of one or more of processing nodes 106. Entity resolution program 108 may select some or all entities of the candidate data as candidate entities. In another embodiment, entity resolution program 108 selects candidate entities based on one or more criteria, which may identify one or more entity types, feature types, feature values, feature element types, feature element values, relationships, or any combination thereof. In one example, entity resolution program 108 utilizes criteria to select candidate entities that belong to a land vehicle entity type, have a license plate feature, have a VIN feature, and wherein the license plate feature has a feature value including the string "ABC." In one embodiment, entity resolution program 108 selects a candidate entity if the candidate entity meets all of the criteria. In another embodiment, entity resolution program 108 selects a candidate entity by determining whether a weighted score of the candidate entity exceeds a predetermined threshold. For example, each criterion of the criteria may have an associated weight indicating the importance of the criterion.

In some embodiments, processing nodes 106 store a candidate data library of data store 114 in high-speed storage (e.g., flash memory or RAM) local to one or more of processing nodes 106. In one example, processing nodes 106 store the local copy of the candidate data library to working set 110. Such embodiments enable processing nodes 106 to query the local copy of the candidate data library without interfering with, or competing with, other access to data store 114 by, for example, data store access program 103 or feature recognition program 104.

In step 306, entity resolution program 108 compares the candidate entities to the observed entity. In one embodiment, entity resolution program 108 compares the entity type, features, and feature elements of the observed entity to the entity type, features, and feature elements of each candidate entity in order to determine a degree of similarity between the observed entity and each candidate entity. In various embodiments, the degree of similarity may be a relative measure (e.g., a ranking) or an objective measure (e.g., a score) determined by one or more entity resolution rules, scoring algorithms, or ranking schemes. For example, according to rules that consider vessel capacities as features or feature elements relevant for comparison, the degree of similarity of an oil tanker to a schooner is typically lower than the degree of similarity between two oil tankers. It is understood that various implementations can utilize various methods for determining the degree of similarity. In one such embodiment, entity resolution program 108 may determine the degree of similarity based on the entity type, one or more feature types, one or more feature values, one or more feature element types, one or more feature element values, one or more relationships, or a combination thereof. For example, entity resolution program 108 may determine the degree of similarity based on a value of a unique identifier feature, wherein the observed entity and each candidate entity include the unique identifier feature. In another such embodiment, the entity type and any associated feature types and feature element types may each be weighted to reflect the importance of each. For example, a feature value representing a model number may be weighted heavily to reflect high importance relative to a feature value representing a finish style.

In step 308, entity resolution program 108 determines relationships of the observed entity. In one embodiment, entity resolution program 108 determines one or more relationships between the observed entity and a candidate entity. A relationship exists between two entities where the likelihood that the two entities interact in a meaningful way exceeds a predetermined threshold. For example, a first cargo truck may have a relationship to a second cargo truck where both the first and second cargo trucks are members of a single cargo convoy. In one embodiment, entity resolution program 108 determines that a relationship exists between the observed entity and a candidate entity by comparing features of the resolved entity to features of one or more of the candidate entities. In other embodiments, entity resolution program 108 compares data representing the observed entity to data representing one or more other candidate entities or to one or more other observed entities. Entity resolution program 108 may determine that zero or more relationships exist with respect to the observed entity.

In step 310, entity resolution program 108 determines a resolved entity. In one embodiment, entity resolution program 108 determines a resolved entity by resolving the observed entity with a candidate entity. In one embodiment, entity resolution program 108 resolves the observed entity with a candidate entity by applying one or more entity resolution rules, scoring algorithms, or ranking schemes to identify, among a plurality of relevant candidate entities, a candidate entity based on a determined degree of similarity. In some embodiments, entity resolution program 108 resolves an observed entity by generating data representing a new resolved entity, based at least on data representing the observed entity. In one such embodiment, entity resolution program 108 determines that the observed entity sufficiently matches none of the candidate entities by, for example, determining that the degree of similarity between the observed entity and each of the candidate entities falls below a predetermined threshold. For example, entity resolution program 108 may determine that zero or more candidate entities are identical to, and thus resolvable with, the observed entity. Entity resolution program 108 may determine that there is a 1:1 relationship (i.e., an identity relationship) between a candidate entity and an observed entity. In this case, entity resolution program 108 may determine a resolved entity by resolving the observed entity based on the candidate entity. Alternatively, entity resolution program 108 may determine there is no relationship between a candidate entity and an observed entity, or that a relationship other than a 1:1 relationship exists between the candidate entity and the observed entity. In one embodiment, in response to determining that an observed entity sufficiently matches none of the candidate entities, entity resolution program 108 generates data representing the observed entity and may determine a relationship other than a 1:1 relationship (i.e., an identity relationship) between the observed entity and one or more candidate entities. For example, entity resolution program 108 may determine a 1:many relationship (i.e., a "has a") relationship, or another type of associative relationship, between the observed entity and one or more candidate entities. In some embodiments, entity resolution program 108 generates data representing the observed entity and adds the generated data to the candidate data for comparison with other observed entities.

In step 312, entity resolution program 108 sends data representing the resolved entity and any determined entity relationships to data store access program 103. In some embodiments, the resolved entity may have one or more features, each of which has a feature value. In some embodiments, the resolved entity may correspond to one or more relationships, in which case entity resolution program 108 sends data representing the one or more relationships to data store access program 103. In some embodiments, entity resolution program 108 stores data representing resolved entities and determined relationships in working set 110 and notifies data store access program 103 of such newly stored resolved entity and determined relationship data. In one such embodiment, data store access program 103 accesses working set 110 in response to receiving a notification in order to retrieve such newly stored resolved entity and determined relationship data. In another embodiment, data store access program 103 accesses working set 110 to retrieve such newly stored resolved entity and determined relationship data based on one or more criteria such as, for example, receiving a pre-determined quantity of notifications, the accumulation of an amount of such newly stored data beyond a pre-determined threshold, or the availability of non-contentious access to data store 114.

In various embodiments, data store access program 103, feature recognition program 104, and entity resolution program 108 may be implemented as components of one, two, three, or more separate computer program modules (e.g., "executables" or "dynamically-linked libraries"). In some embodiments, data store access program 103 and feature recognition program 104 may operate within a combined computer program process, an instance of which can run on each of data store access nodes 102. In other embodiments, data store access program 103 and feature recognition program 104 may each run within distinct processes, both of which may run on each of data store access nodes 102, or certain of which may run on certain of data store access nodes 102. In one embodiment, data store access program 103, feature recognition program 104, and entity resolution program 108 may all run in a combined process, an instance of which may run on each of data store access nodes 102 and processing nodes 106.

Figure 4:
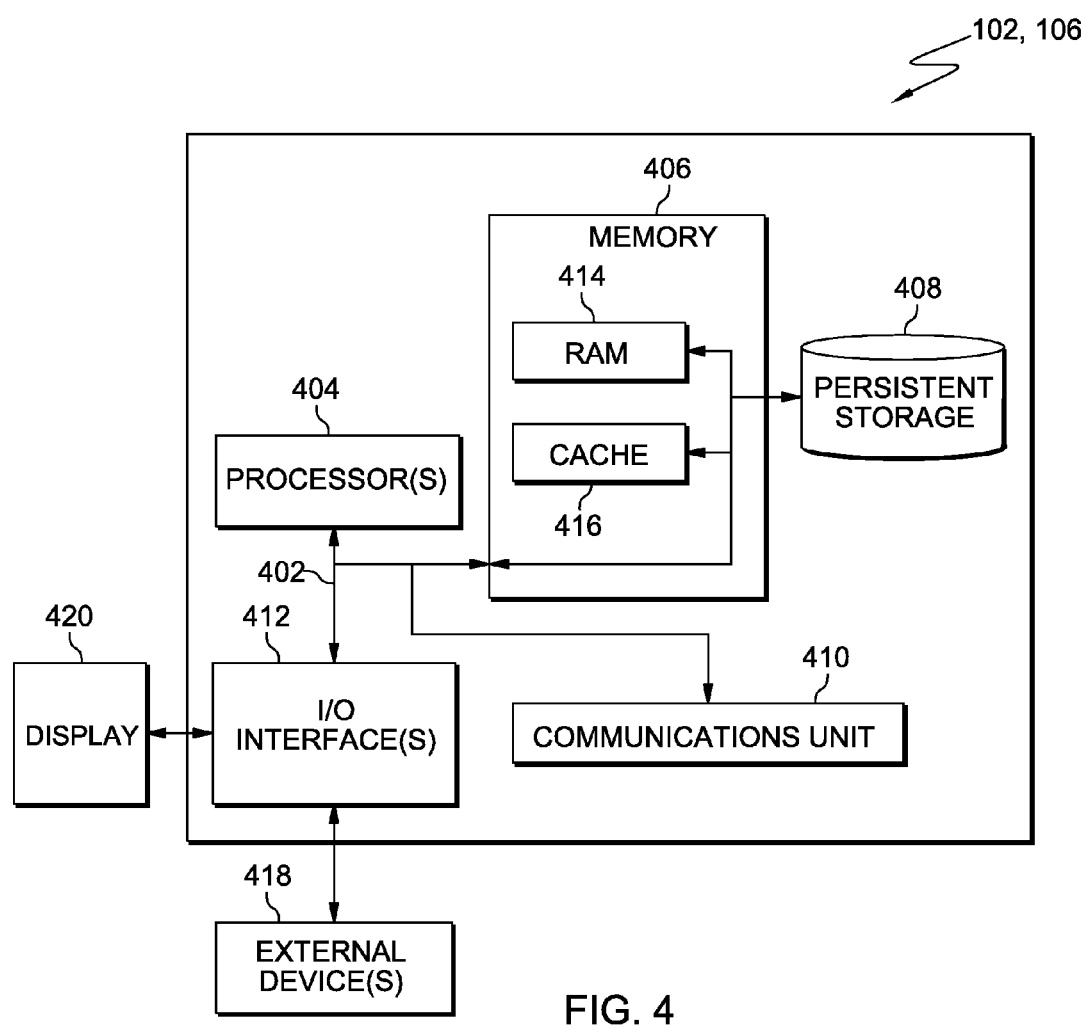
FIG. 4 depicts a block diagram of components of each of the data store access nodes and each of the processing nodes, in accordance with an embodiment of the present disclosure.

FIG. 4 depicts a block diagram of components of one of data store access nodes 102 or one of processing nodes 106, in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Each of data store access nodes 102 or processing nodes 106 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Data store access program 103, feature recognition program 104, working set 110, and entity resolution program 108 are stored in persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, removable drives (e.g., Universal Serial Bus thumb drives), and smart cards that are inserted into a drive for transfer onto another computer-readable storage medium that is also part of persistent storage 408.

Communications unit 410, in these examples, provides for communications with other data processing systems or devices, including resources of data store access nodes 102, data source 116, processing nodes 106, and data store 114. In these examples, communications unit 410 includes one or more network interface cards. Communications unit 410 may provide communications through the use of either or both physical and wireless communications links. Data store access program 103, feature recognition program 104, working set 110, and entity resolution program 108 may be downloaded to persistent storage 408 through communications unit 410.

I/O interface(s) 412 allows for input and output of data with other devices that may be connected to each of data store access nodes 102 or processing nodes 106. For example, I/O interface(s) 412 may provide a connection to external devices 418 such as a keyboard, a keypad, a touch screen, and/or some other suitable input device. External devices 418 can also include portable computer-readable storage media such as, for example, thumb drives, portable optical or magnetic disks, and memory cards. Software and data used to practice embodiments of the present disclosure, e.g., data store access program 103, feature recognition program 104, working set 110, and entity resolution program 108, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A method for distributed analytics processing, the method comprising:
   receiving, by one or more processors of one or more access nodes, an observation that includes data describing an observed entity having one or more features;
   updating, by one or more processors of the one or more access nodes, a plurality of copies of an observed entity library based, at least in part, on the observation, wherein a first copy of the observed entity library resides, at least in part, on one or more working sets, and wherein a second, complete copy of the observed entity library resides on a persistent data store;
   retrieving, by one or more processors of a specific processing node, data that is associated with the observed entity, wherein the specific processing node is one processing node of one or more processing nodes and wherein each processing node includes a respective working set;
   selecting, by one or more processors of the specific processing node, one or more candidate entities from a first copy of a candidate data library, wherein:
   each of the one or more working sets stores a respective portion of the first copy of the candidate data library;
   the first copy of the candidate data library is a complete copy of the candidate data library that is distributed among the one or more working sets; and
   a second, complete copy of the candidate data library resides on the persistent data store;
   for a specific candidate entity of the one or more candidate entities, determining, by one or more processors of the specific processing node, a degree of similarity between the observed entity and the specific candidate entity based at least in part, on the one or more features of the observed entity, and in response, associating the degree of similarity with the specific candidate entity;
   determining, by one or more processors of the specific processing node, a resolved entity based, at least in part, on the degree of similarity; and
   in response to data received from one or more processors of the specific processing node, updating, by one or more processors of the one or more access nodes, a resolved entity library that resides on the persistent data store such that the resolved entity library identifies the resolved entity.

2. The method of claim 1, further comprising:
   determining, by one or more processors of the specific processing node, that a relationship exists between the observed entity and a related candidate entity, wherein the related candidate entity is one of the one or more candidate entities; and
   sending, by one or more processors of the specific processing node, data representing the relationship to the one or more access nodes.

3. The method of claim 1, further comprising:
   assigning, by one or more processors of the one or more access nodes, the observed entity to the specific processing node, and in response, sending, by one or more processors of the one or more access nodes, the data that is associated with the observed entity to the specific processing node.

4. The method of claim 1, further comprising:
   sending, by one or more processors of the one or more access nodes, the data that is associated with the observed entity to at least one processing node, wherein the at least one processing node serves as a control node; and assigning, by one or more processors of the control node, the observed entity to the specific processing node, and in response, sending, by one or more processors of the control node, the data that is associated with the observed entity to the specific processing node.

5. A computer program product for distributed analytics processing, the computer program product comprising:

one or more computer-readable storage media and program instructions stored on the one or more computer-readable storage media, the program instructions comprising program instructions to:

program instructions to receive, by one or more access nodes, an observation that includes data describing an observed entity having one or more features;

program instructions to update, by the one or more access nodes, a plurality of copies of an observed entity library based, at least in part, on the observation, wherein a first copy of the observed entity library resides, at least in part, on one or more working sets, and wherein a second, complete copy of the observed entity library resides on a persistent data store;

program instructions to retrieve, by a specific processing node, data that is associated with the observed entity, wherein the specific processing node is one processing node of one or more processing nodes and wherein each processing node includes a respective working set;

program instructions to select, by the specific processing node, one or more candidate entities from a first copy of a candidate data library, wherein:

each of the one or more working sets stores a respective portion of the first copy of the candidate data library;

the first copy of the candidate data library is a complete copy of the candidate data library that is distributed among the one or more working sets; and a second, complete copy of the candidate data library resides on the persistent data store;

program instructions to, for a specific candidate entity of the one or more candidate entities, determine, by the specific processing node, a degree of similarity between the observed entity and the specific candidate entity based at least in part, on the one or more features of the observed entity, and in response, associating the degree of similarity with the specific candidate entity;

program instructions to determine, by the specific processing node, a resolved entity based, at least in part, on the degree of similarity; and program instructions to, in response to data received from one or more processors of the specific processing node, update, by the one or more access nodes, a resolved entity library that resides on the persistent data store such that the resolved entity library identifies the resolved entity.

6. The computer program product of claim 5, the program instructions further comprising:

program instructions to determine, by the specific processing node, that a relationship exists between the observed entity and a related candidate entity, wherein the related candidate entity is one of the one or more candidate entities; and program instructions to send, by the specific processing node, data representing the relationship to the one or more access nodes.

7. The computer program product of claim 5, the program instructions further comprising:

program instructions to assign, by the one or more access nodes, the observed entity to the specific processing node, and in response, send, by the one or more access nodes, the data that is associated with the observed entity to the specific processing node.

8. The computer program product of claim 5, the program instructions further comprising:

program instructions to send, by the one or more access nodes, the data that is associated with the observed entity to at least one processing node, wherein the at least one processing node serves as a control node; and program instructions to assign, by the control node, the observed entity to the specific processing node, and in response, send, by the control node, the data that is associated with the observed entity to the specific processing node.

9. A computer system for distributed analytics processing, the computer system comprising:

one or more computer processors;

one or more computer-readable storage media;

program instructions stored on the computer-readable storage media for execution by at least one of the one or more processors, the program instructions comprising program instructions to:

program instructions to receive, by one or more access nodes, an observation that includes data describing an observed entity having one or more features;

program instructions to update, by the one or more access nodes, a plurality of copies of an observed entity library based, at least in part, on the observation, wherein a first copy of the observed entity library resides, at least in part, on one or more working sets, and wherein a second, complete copy of the observed entity library resides on a persistent data store;

program instructions to retrieve, by a specific processing node, data that is associated with the observed entity, wherein the specific processing node is one processing node of one or more processing nodes and wherein each processing node includes a respective working set;

program instructions to select, by the specific processing node, one or more candidate entities from a first copy of a candidate data library, wherein:

each of the one or more working sets stores a respective portion of the first copy of the candidate data library;

the first copy of the candidate data library is a complete copy of the candidate data library that is distributed among the one or more working sets; and a second, complete copy of the candidate data library resides on the persistent data store;

program instructions to, for a specific candidate entity of the one or more candidate entities, determine, by the specific processing node, a degree of similarity between the observed entity and the specific candidate entity based at least in part, on the one or more features of the observed entity, and in response, associating the degree of similarity with the specific candidate entity;

program instructions to determine, by the specific processing node, a resolved entity based, at least in part, on the degree of similarity; and program instructions to, in response to data received from one or more processors of the specific processing node, update, by the one or more access nodes, a resolved entity library that resides on the persistent data store such that the resolved entity library identifies the resolved entity.

10. The computer system of claim 9, the program instructions further comprising:
   program instructions to determine, by the specific processing node, that a relationship exists between the observed entity and a related candidate entity, wherein the related candidate entity is one of the one or more candidate entities; and
   program instructions to send, by the specific processing node, data representing the relationship to the one or more access nodes.

11. The computer system of claim 9, the program instructions further comprising:
   program instructions to assign, by the one or more access nodes, the observed entity to the specific processing node, and in response, send, by the one or more access nodes, the data that is associated with the observed entity to the specific processing node.

12. The computer system of claim 9, the program instructions further comprising:
   program instructions to send, by the one or more access nodes, the data that is associated with the observed entity to at least one processing node, wherein the at least one processing node serves as a control node; and
   program instructions to assign, by the control node, the observed entity to the specific processing node, and in response, send, by the control node, the data that is associated with the observed entity to the specific processing node.

* * * * *